Patented Jan. 22, 1929.

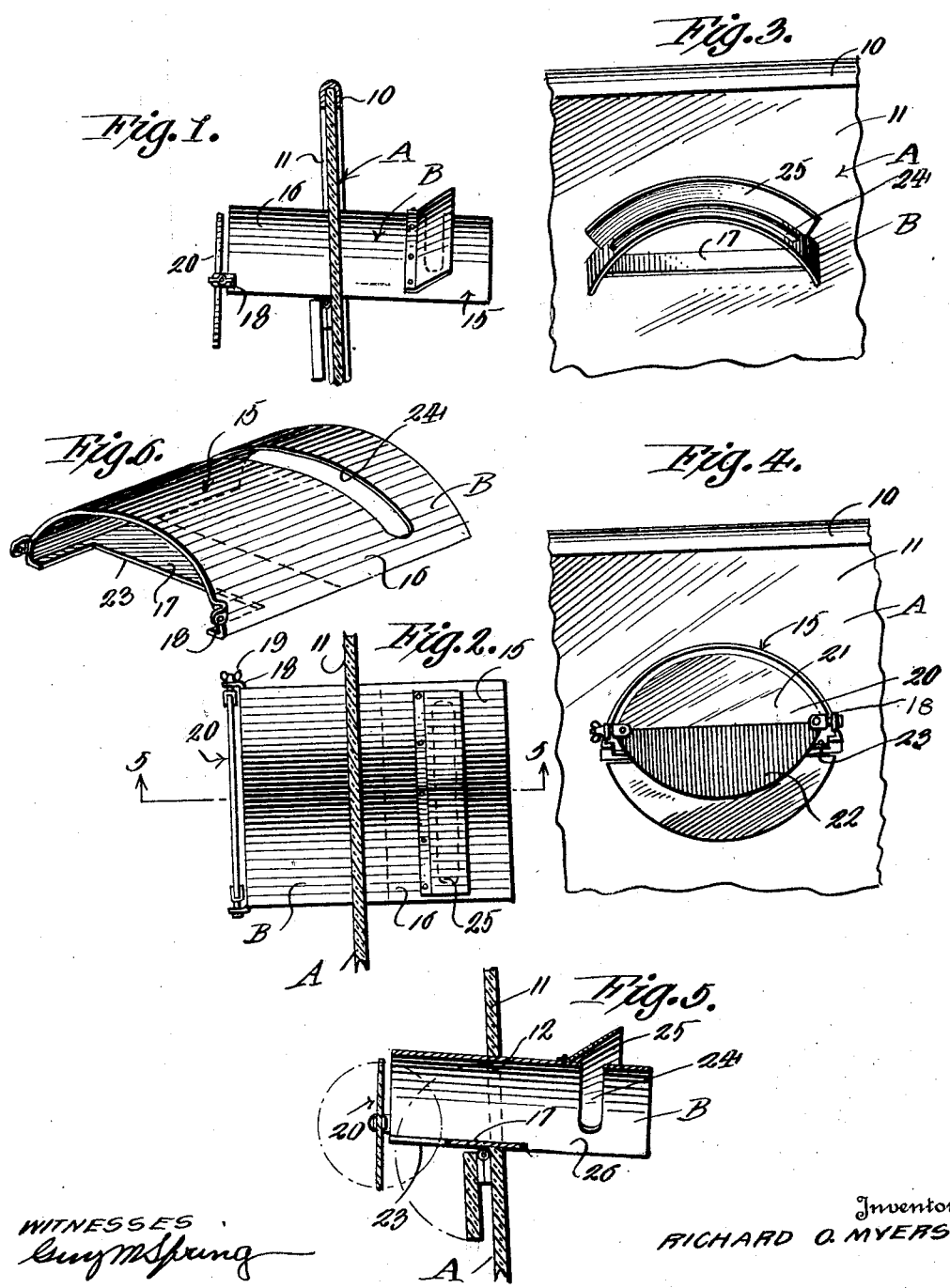

1,699,620

UNITED STATES PATENT OFFICE.

RICHARD O. MYERS, OF LEECHBURG, PENNSYLVANIA.

AUTOMOBILE WINDSHIELD.

Application filed February 2, 1927. Serial No. 165,462.

This invention relates to attachments for windshields of automobiles and is an improvement on my Patent No. 1,606,094, issued to me November 9, 1926.

The primary object of the present invention is the provision of a sight tube arranged to project forwardly through the windshield of an automobile in order to insure a clear vision to the driver of the automobile in rainy or snowy weather with novel means for deflecting wind, snow, rain and the like past the sight tubes.

Another object of the invention is the provision of a sight tube of the above character having a slot formed in the upper wall thereof forwardly of the windshield with a novel wind deflector carried by the wall of the tube adjacent to the slot for throwing or deflecting the wind, snow, rain or the like downward at an angle past the tube on to the windshield.

A still further object of the invention is to provide a novel means for keeping the sight tube clear of snow, rain and the like at all times irrespective of the direction in which the snow or rain may be coming.

With these and other objects in view, the invention consists in the novel construction, arrangement and formation of parts, as will be hereinafter more specifically described, claimed, and illustrated in the accompanying drawings, in which:

Figure 1 is a transverse section through an automobile windshield showing the improved sight tube incorporated therewith, Figure 2 is a horizontal section through the windshield showing the improved sight tube incorporated therewith, the sight tube being illustrated in plan, Figure 3 is a front elevation of the improved sight tube incorporated with the windshield, Figure 4 is a rear elevation of the improved sight tube showing the same incorporated with a windshield, Figure 5 is a longitudinal section through the sight tube showing the same incorporated with a windshield, and Figure 6 is a perspective view of the sight tube with the wind deflector removed therefrom.

Referring to the drawing in detail, wherein similar reference characters designate corresponding parts throughout the several views, the letter A indicates a windshield of an automobile and B a novel sight tube therefor. The windshield A can be of the usual or any preferred character and includes the ordinary frame 10 for supporting the glass plate 11.

The improved sight tube B comprises a tube 15 constructed from sheet metal or the like and this tube can be of any desired cross section, but as shown, the same preferably consists of an upper arcuate wall 16 and a lower flat wall 17 connected with the sides of the top wall. In accordance with this invention the sight tube is inserted through a suitable opening 12 formed in the windshield and the tube is preferably arranged at a slight angle to the horizontal so that the forward end of the shield will be inclined downward and thereby insure the proper vision of the driver of the vehicle on the roadway.

The inner end of the sight tube has formed thereon rearwardly projecting pivot ears 18 which rotatably receive the pivot pins 19 carried by the terminals on the shade plate 20. The pins 19 are arranged at the longitudinal axis of the shade plate and the same includes a clear portion 21 and a colored portion 22 above and below the longitudinal axis respectively. This allows either a clear glass to be brought in front of the sight tube or the colored portion when driving in sunny weather. The lower wall 17 has its rear end notched as at 23 so as to allow the rotation of the shade plate. In order to keep the sight tube entirely clear from rain, snow, and wind the upper wall of the sight tube in front of the windshield is provided with a transverse arcuate slot 24 and a windshield 25 is arranged directly in rear of this slot. The shield or deflector plate 25 is arranged at an angle to the horizontal and this angle can be forty-five degrees if desired. This plate is also of arcuate formation so as to conform to the transverse curvature of the upper wall 16.

The lower wall 17 below the slot 24 is cut away as at 26 for a purpose, which will be later described. The provision of the shield or deflector plate 25 forms a salient object of the present invention and this plate acts to catch the wind so as to deflect the same downward through the sight tube and out of the slot 24 which is provided for this purpose, and below the same on to the windshield. Deflection of the wind will carry the snow and rain therewith which will insure a clear vision through the sight tube at all times irrespective of weather conditions. This is important and insures the effective and proper use of the tube.

Changes in details may be made without departing from the spirit or scope of this invention, but

What I claim as new is:

1. The combination with a windshield provided with an opening, of a sight tube fitted in the opening extending at an angle to the windshield, a transverse slot in the upper wall of the sight tube in front of the windshield, the lower wall of the sight tube being notched below said slot, and a deflector shield arranged at the incline to the horizontal both adjacent to the slot for deflecting the wind and elements downward at an angle below the sight tube.

2. The combination with a windshield provided with an opening, of an elongated sight tube fitted in the opening extending at an angle to the windshield including an arcuate upper wall and a flat lower wall, the arcuate upper wall having a transverse slot therein in front of the windshield, the lower wall having a portion thereof cut away below the slot, and a deflector shield secured to the upper wall and arranged at an angle to the horizontal and overlying said slot for deflecting the wind and elements down at an angle through the slot below the windshield.

In testimony whereof I affix my signature.

RICHARD O. MYERS.